June 6, 1939.  B. M. BENSEN  2,160,820
TRIANGLE SOLVING INSTRUMENT
Filed July 18, 1935  2 Sheets-Sheet 2
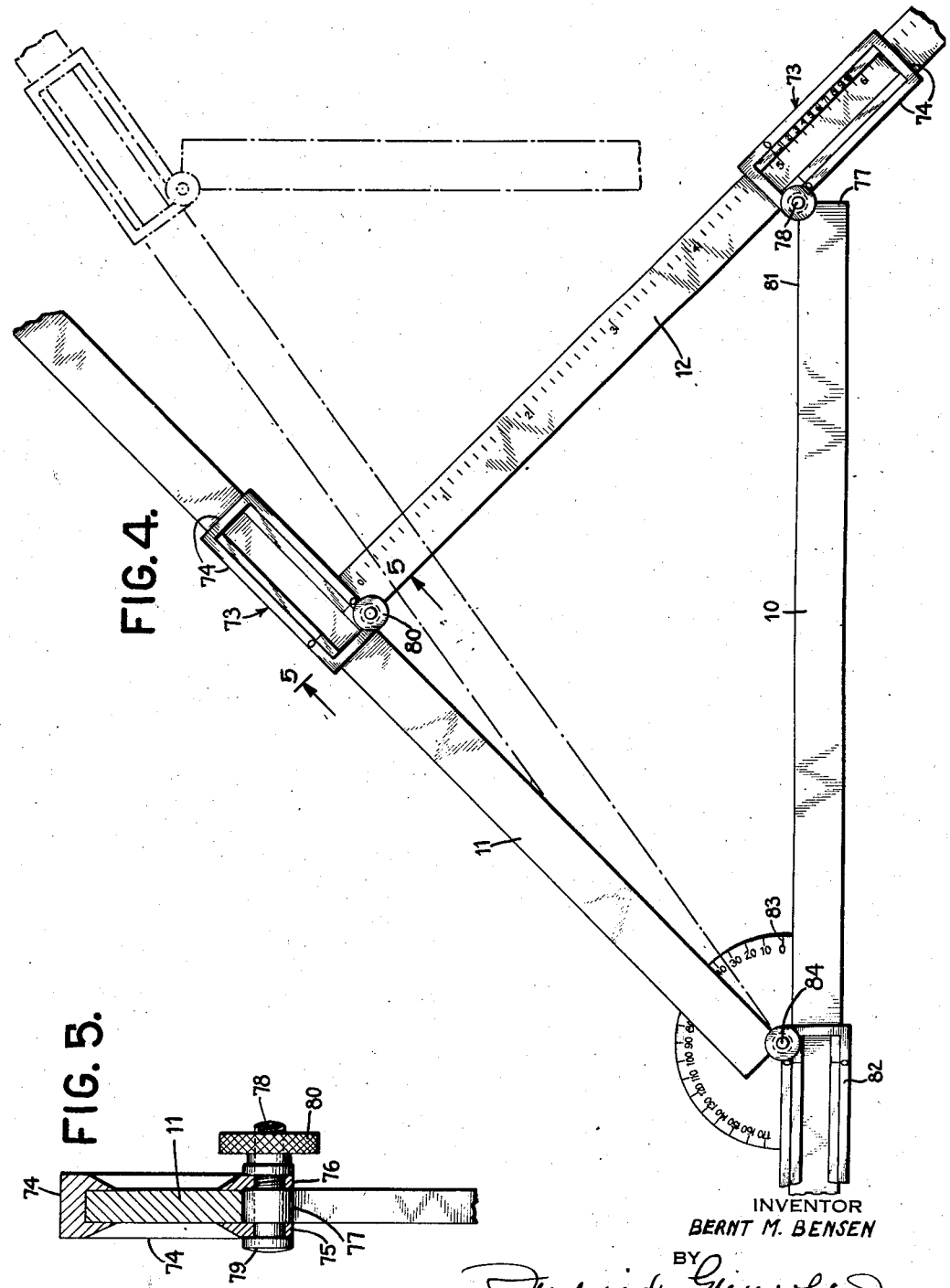
INVENTOR
BERNT M. BENSEN
BY
Frederick Griswold Jr.
ATTORNEY Patented June 6, 1939

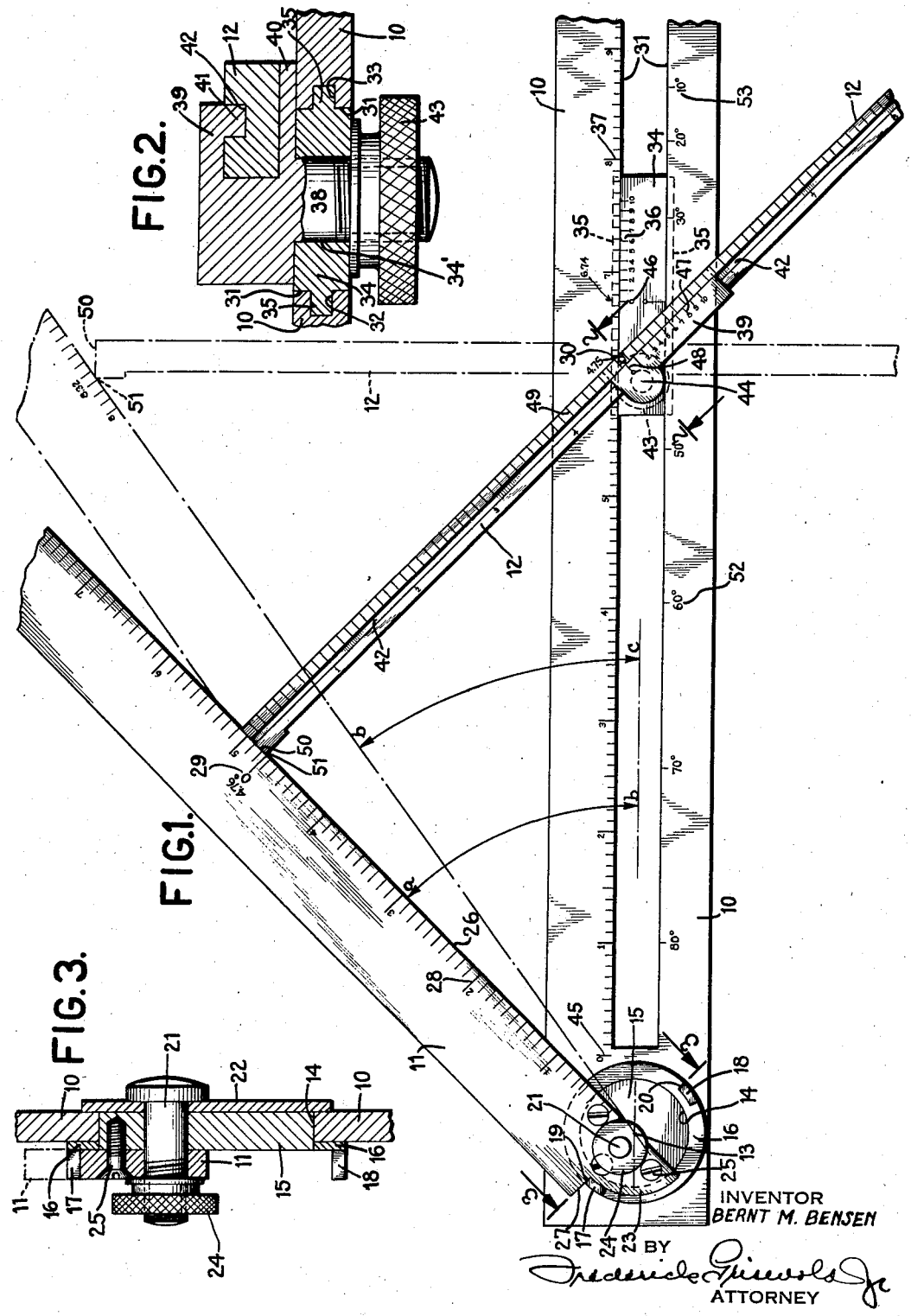

2,160,820

UNITED STATES PATENT OFFICE 2,160,820

TRIANGLE SOLVING INSTRUMENT

Bernt M. Bensen, Brooklyn, N. Y.

Application July 18, 1935, Serial No. 32,032

20 Claims. (Cl. 33—98)

The invention relates in general to an instrument for solving trigonometric functions and the invention relates specifically to a carpenter's rule designed for obtaining the length and angularity of cuts for house roof rafters and the like. The present disclosure constitutes a development of the similar construction disclosed in my copending application Serial No. 538,833 filed May 20, 1931, entitled "Carpenters' tool".

The primary object of the invention is to provide a simplified form of tool forming the three sides of a triangle and each side provided with a linear scale or scales for permitting the direct reading thereon of the lengths of the sides of any triangle formed within the limits of the instrument, whereby with knowledge of any three of the six variable factors of a triangle the other factors may be quickly ascertained.

In its specific application to its use for determining the plumb and side cut angles of a roof rafter, the present disclosure features means whereby these angles may be quickly ascertained from any known length of run and rise of the roof structure.

Still another object of the invention is to provide a structure by means of which the desired right angle relation between two of the side forming members may be quickly set without necessity of referring to a protractor or other fine division indication of angular measurements.

Still another object of the invention is to provide means for temporarily securing the triangular forming parts in their adjusted relative position so as to fix at least two of the apex angles and thus fix the triangle as a whole.

Still another object of the invention is to provide a vernier arrangement of scale indicator at one or more of the apices to increase accuracy of reading of the associated scales and to mount the vernier or verniers so that they may be readily viewed in the several angularly adjusted positions of the triangular sides or bars.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a view in plan of an instrument illustrating a preferred embodiment of the invention and showing the parts arranged in full line to obtain the plumb cut angle of a roof rafter, together with its length and showing in ghost outline the resetting of the instrument to obtain the angle of the side cut for the rafter;

Figs. 2 and 3 are enlarged transverse sectional views taken respectively on the planes indicated by the lines 2—2 and 3—3 of Fig. 1 looking in the direction indicated by the arrows;

Fig. 4 is likewise a view corresponding in full and ghost outlines to the showing in Fig. 1 and disclosing still another modified form of the invention; and Fig. 5 is an enlarged transverse sectional view taken on the plane indicated by the line 5—5 of Fig. 4.

In the drawings there are shown three bars each intersecting the other two to form a triangle and said bars comprising a body 10, a blade 11 and an indicator 12. In each case the body and blade are pivotally connected for relative rotary movement about an axis of rotation indicated at 13 and extending perpendicular to the plane of the triangle. This axis of rotation is formed differently in the showing of the three forms of the invention illustrated.

In the form illustrated in Fig. 1, the body 10 is provided at the left end thereof with a circular opening 14 providing a bearing for a pivot disc 15 rotatably mounted therein. The opening 14 is outlined on one side thereof by means of a stop ring 16 provided at diametrically opposite points thereof with stops 17 and 18. These two stops are provided on one side thereof with flat faces 19 and 20 disposed in the diametric line containing the axis 13. A clamping screw 21 (see Fig. 3) is passed through a backing plate 22 and through the disc 15 in offset relation to the axis of rotation and through an extension 23 projecting from the pivoted end of the blade 11. A set nut 24 engaging the clamping screw acts to bind the blade 11 in its rotatably adjusted position relative to the body 10. It is herein suggested that the blade be reversed in its position on the pivot disc so as to project therefrom at an angle of 180° from the position shown in Fig. 1 and for this purpose the blade 11 is demountably secured to the disc 15 by means of three short machine screws 25. The inner edge 26 of the blade 11 extends longitudinally thereof and the blade 11 is provided with a transversely extending stop face 27, the edges of faces 26 and 27 intersecting each other at the axis of rotation 13. The blade 11 is provided along its edge 26 with a linear scale 28 actually graduated in the instant case into inches and subgraduated into tenths of an inch, but intended to represent feet and tenths thereof.

The blade is provided at an arbitrary distance from the point 13 with a zero degree mark 29 and which in the instant case is set at 4.76 inches from the point 13 measured along the edge 26. It is understood that this zero degree mark may be at any position along the blade 11 provided its corresponding marks at 30 are equidistantly spaced therefrom along the indicator 12, as hereinafter more fully described.

The body 10 constitutes a single strip provided centrally thereof with a slot or runway 31 at opposite edges thereof provided with grooves 32 and 33 as best shown in Fig. 2. A block 34 provided on opposite sides with runners or ribs 35 is slidably mounted in the grooves 32 and 33 and constitutes a slide designed to be adjustably positioned along the length of the runway 31. The slide 34 is relatively long and is provided on its right hand end as shown in Fig. 1 with a vernier scale 36 designed to cooperate conventionally with a linear scale 37 formed on the body 10 and along one edge of the runway 31. The left end of the slide is provided with a circular opening 34¹ in which is rotatably mounted the bolt element 38 of a clamp 39. The clamp includes a bottom plate 40 overhanging the body 10 as shown in Fig. 2 and an L-shaped channel forming tongue construction 41 engaging in a groove 42 formed centrally in the top of the indicator 12. A nut 43 engaging the bolt 38 acts to secure the indicator 12 in its rotatable and longitudinally adjusted position relative to the slide and thus relative to the body 10. From this construction it is seen that loosening the nut 43 permits the rotation of the indicator 12 bodily about the axis of the bolt 38 indicated at 44.

The scale 37 is offset along the body 10 and has its zero mark 45 displaced lengthwise of the body 10 a distance from the axis or apex of the triangle at 13 a distance equal to the distance between the axis 44 and the zero mark 46 of the vernier scale 36. In this way the indicator 12 may be moved about its axis 44 and at the same time permit the entire vernier scale 36 to be visible in all positions of the indicator.

Clamp 39 is also provided with a vernier scale 47 having its zero point 48 in line with the axis 44 and cooperating with a scale 49 on the indicator 12. This indicator scale has its zero point coinciding with the squared end 50 of the indicator 12. It is considered that the inner edge corner 51 of the indicator 12 forms the zero point of the scale 49. From this construction it is understood that the triangle is defined by the apices 13, 51, 44, and that the sides of such triangle are formed by the edge 26, the line connecting 51 and 44 and by the line centered in the runway 31 and connecting the points 13 and 44.

The body 10 is also provided with a degree scale 52 herein marked in decreasing numerical values from the point 13 with progressively decreasing numerical values beginning with 80° and decreasing ten degrees down to the 10° notation at 53. It is understood that the scale 52 cooperates with the zero degree marks at 29 and 30 hereinafter described to indicate the included angles formed between the body 10 and blade 11 when the indicator at 12 is swung about the point 29 as a center and with point 30 registering selectively with any of the degree marks along the scale 52 to form the angle indicated by the scale designation. While the scale 52 is shown with the ten degree intervals, it is suggested that there is ample space especially in the higher values at the left to indicate more refined graduations.

Referring to the showing in Fig. 4, it will be understood that each of the bars forming the body 10, blade 11 and indicator 12, is provided at one end thereof with a pivotal connection carrying a slide in which the next adjacent bar is slidably mounted. As these slides are of similar construction, the description of any one of them will be sufficient for either of the other two. Each slide 73 is formed as a long rectangular opened sided frame 74 as particularly shown in Fig. 5 and within each of which slides is mounted one of the bars 10, 11 or 12. At one corner the slide is provided with a pair of hinge ears 75, 76, between which is received the loose end of a hinge strap 77 mounted on a combined hinge pin and clamping screw 78. This screw is provided at one end with a head 79 and at the opposite end with a clamping nut 80. The axis of rotation provided by the pin 78 is at the point of intersection of the end 77 of each bar and the inner long edge of its associated slide. The ends 77 are each formed accurately to extend at right angles to the length of its associated bar and the parts are so arranged that when the squared end 77 contacts with its associated slide as shown at the top of Fig. 4 then the bars so pivotally connected extend accurately at right angles to each other.

From this construction it is seen that the triangles formed by the bars have as their apices the axis of rotation provided by the three pivotal connections at 78 and the sides of the triangle so formed coincide approximately with the inner edge faces of the three bars. Simply by shifting the slides selectively along their associated bars different length sides to the desired triangle may be obtained and as any of the slides can be quickly swung each to engage with its associated stop face 77 it is thus possible to form quickly an included right angle between the bar upon which the slide is mounted and the bar with which it is pivotally connected through the slide. For instance, in the full line showing in Fig. 4 the right angle is formed between the blade 11 and the indicator 12 but in the ghost outline showing the lower right slide has been lowered to engage the right end of the body and thus the right angle is formed between the body and the indicator.

In the showing in Fig. 4, the lower left hand slide at 82 is provided with a protractor 83 graduated in angular degrees from zero to 180° with the zero degree mark in line with the associated axis 84 between the body 10 and blade 11, and the axis marked 78 between the body and indicator 12.

In operation and referring specifically to the showing in Fig. 1 and with the parts in the full line position with the indicator 12 extending at right angles to the blade 11, it will be understood that any right triangle can be solved if the lengths of any two sides are known and can be indicated by positioning pointer 51 at one length indication on scale 29 and positioning pointer 48 at the other length indication on scale 42. The answer as to what is the length of the third side, or hypotenuse, can be read directly on scale 35 by reading vernier 36 on scale 35.

From the showing in Fig. 4 with its protractor 83 any right triangle may be solved if the length of one side is known and set on the blade or indicator scale and one of the acute angles is known. The known acute angle is set by adjusting blade 11 to the known angular position indicated on the protractor.

Referring to the use of the device shown in Fig. 1 as a carpenter's rule in laying out the house roof rafters, let it be assumed, for example, that the rise of the roof is 4.76 feet and the run is 4.75 feet. In this case the inches of the scale may be regarded as feet. The pointer 51 of the indicator 12 is moved along the scale 28 until it registers at the 4.76-inch place on the scale and while keeping the indicator 12 at right angles to the blade 11 the indicator is slid along the slide 34 until its indicator mark 48 registers with the 4.75 position on the indicator scale 49 and when so set the parts are temporarily locked in position by screwing tight the nut 43. In this case it is found that indicator 46 has been shifted to give the reading, with the assistance of the vernier 36, as 6.74 and this indicates the length in feet of the rafter. This setting of the instrument also indicates the angle a—b formed between the body 10 and the blade 11 and which is the correct plumb cut to be given the rafter so that it may fit the ridge board of the roof construction.

Differently considered, the bevel which must be cut at the end of the rafter is an angle whose sine is 4.76 over 4.75, or, in the illustrated case, the angle a—b is approximately and slightly less than 45°.

In order to obtain the correct angle for the side cut for the rafter, nut 43 is loosened and without changing the longitudinal position of the indicator 12 relative to the slide that is, axis 44 is retained at 4.75 and 6.74 positions respectively, the indicator is swung about the axis 44 until it extends at right angle or is perpendicular to the length of the body 10 as indicated in ghost line in Fig. 1. The blade 11 is then lowered and swung about its axis 13 from the full line position into the dotted line position. It is noted in the instant case that the indicator 51 registers with the 8.32 mark on the scale 28. At the same time the angle a—b has decreased to the angle b—c and thus indicates the correct side cut for the rafter in the illustrated instance. It is seen from this illustration that angle a—b is formed from the known lengths of the run and rise of the house roof and that the hypotenuse of the formed resulting triangle becomes one of the sides of the second formed triangle, the other side represented by the indicator 12 remaining unaltered.

In those cases which are quite frequent where it is desired that the blade 11 extend 45° to the length of the body 10, the blade 11 is simply swung until its transverse edge 27 contacts with either the stops 17 or 18 or until the edge 26 contacts with stops 17 or 18 so as to thus obtain any of the desired angles of 45°, 90° and 135° between the blade 11 and the body 10. It is also possible in moving the blade 11 forcefully against either of the stops 17 or 18 to shift the ring 16 circumferentially and bodily into any rotative position relative to the body 10 and then by moving the blade 11 in the relatively reversed direction into engagement with the other stop, the blade will assume a position extending at 90° from its former position bearing on the first named stop.

Where some other degree of angle is desired between the blade and body, the point 51 is located at the zero mark 29 and the indicator 12 is shifted to swing about 29 as a center until zero mark 30 on the indicator is opposite the desired marking on scale 52 and when so located the angle between blade 11 and body 10 will be the indicated angle. For instance, in the case illustrated in Fig. 1, indicator 30 is almost at the 45° marking of scale 52 and this means that angle a—b is closely approximate to and slightly more than 45°.

In the showing in Figs. 4 and 5, the slides provide a convenient means for holding one bar while the other bar is slid along its end and the vernier arrangement at the three apices provides convenient means for accurately setting the lengths of the three sides of the formed triangles. The right angles at either end of the indicator may be quickly formed and the opposite angle quickly read on the protractor 33.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In a device of the class described, the combination of three bars coacting to form a triangle, one of the bars forming a body and provided with a longitudinally extending runway, a slide slidably mounted in the runway and provided with a zero mark, another bar forming a blade pivotally connected to the body and the third bar forming an indicator slidably and pivotally connected to the slide and having a squared end accurately formed to extend at right angles to the length of the same and adapted to abut squarely against a side of the blade, each bar provided with a scale graduated in the same units of length, the scale graduations on the body and blade progressively increasing from the pivotal connections between the blade and body and those on the indicator from the right angled end with its zero at said end, the zero of the blade graduations being at its pivotal connection and the zero of the body graduations being displaced along the same from the pivotal connection a distance equal to that between the zero mark on the slide and the pivotal connection between the indicator and slide.

2. In a device of the class described, the combination of three long bars coacting when adjusted relative to each other to form one of the plurality of triangles possibly formed by the device, two of the bars being pivotally connected and one of said connected bars and the third bar provided with means coacting to insure the quick setting of said two last named bars to form an included right angle therebetween, and said three bars being each provided with a scale graduated in the same units of length and each bar associated with an indicator coacting with the scale on one of the other bars, said indicators and scales coacting to permit the direct reading thereon of the lengths of the associated sides of the formed triangle.

3. A device for solving trigonometric functions comprising three bars adapted to form the sides of different triangles, two of the bars being pivotally connected and provided with scales graduated with the same units of length and marked progressively from the pivoted ends of the bars, the third bar provided with means for pivotally connecting it to one of said two bars and with means for setting it to extend at right angles to the other of said two bars and said third bar also provided with a scale having the same unit length graduations and numbered progressively from the end engaging said other pivotally connected bar and having its zero position at the intersection of its scale with the scale on said other bar.

4. A device of the class described, comprising three bars connected to form the three sides of a triangle, two of said bars being pivotally connected, one of said two bars provided with a slide runway extending longitudinally thereof and provided adjacent the runway with a linear scale, a slide guided in the runway and provided with a vernier scale coacting with said linear scale, a long clamp pivotally mounted in the slide for rotary movement about an axis perpendicular to the plane of the triangle and provided with a vernier scale, another of said three bars slidably guided in the clamp to vary its length between the other two bars and rotatable therewith about said axis to vary the angles which it makes with the other two bars and said slidable bar provided with a linear scale coacting with the last named slide vernier scale, means for temporarily securing the slide and clamp in adjusted position relative to each other and to their associated bars, and each of said scales and its associated vernier giving a direct reading of the length of the associated side of the triangle in terms of the linear units of length employed in the scales.

5. In a device of the class described, the combination of three bars coacting to form a triangle, one of said bars provided with a circular opening and provided with a pair of stops at diametrically opposite points of the opening, a pivot disc rotatably mounted in the opening, said stops having stop faces disposed in the same diametrical plane extending through the axis of rotation of the disc, another bar secured to one side of the disc, and adapted to be rotated therewith, said bar provided with a long edge adapted to engage and be thus limited in one rotational direction of movement by one of said stop faces, said bar provided with a transversely extending end edge perpendicular to the long edge and adapted to engage and be thus limited in its rotational movement in the other direction by said other stop faces, said long and transverse edges of the other bar intersecting at the axis of rotation of the disc and means for clamping said two bars in their angularly adjusted positions.

6. In a device of the class described, the combination of three bars coacting to form a triangle, one of said bars provided with a circular opening, a circular disc rotatably mounted in said opening, another bar secured at one end to one side of the disc to rotate therewith, said disc adapted to be reversibly inserted in the opening thereby to present at will opposite sides of the bar secured thereto, said opposite sides being provided with scales graduated in the same linear units, and means for clamping the disc and thus the other bar in angularly adjusted position relative to the first named bar.

7. In a device of the class described, the combination of three bars arranged in triangular form, means pivotally connecting two of the bars with the axis of rotation therebetween defining one of the apices of a triangle, one of said two bars provided with a slide shiftable longitudinally thereon and provided with an indicator mark, the third bar being pivotally connected to the slide and rotatable relative to the bar along which the slide moves and the axis of rotation between the slide and third bar defining another of the apices of said triangle, the bar along which the slide moves provided with a linear scale coacting with the indicator mark for indicating the distance between said two apices and thus indicating the length of one of the sides of the triangle, and the third bar having a squared end extending at right angles to its length and provided with a linear scale for indicating distances measured along the same from the squared end to the second axis of rotation formed between the slide and the third bar and thus measuring distances along another side of the triangle.

8. In a device of the class described, the combination of three bars forming the sides of a triangle, each bar provided with a slide shiftable on its associated bar and having a pivotal connection with the next adjacent bar, the axis of rotation of the three pivotal connections forming the apices of a triangle, each slide provided with a zero mark and one of said bars provided with a linear scale having its zero mark longitudinally offset from the adjacent apex the same distance and in the same direction that the zero mark on its associated slide is similarly offset from its adjacent apex, and the pivotal ends of each bar extending accurately at right angles to their lengths and each bar disposed to extend at right angles to its associated bar when said pivotal ends engage the adjacent side of the contiguous slide.

9. In a device of the class described, the combination of three bars forming the sides of a triangle, each bar provided with a slide shiftable on its associated bar and having a pivotal connection with the next adjacent bar, the axis of rotation of the three pivotal connections forming the apices of a triangle, each slide provided with a zero mark and one of said bars provided with a linear scale having its zero mark longitudinally offset from the adjacent apex the same distance and in the same direction that the zero mark on its associated slide is similarly offset from its adjacent apex, and one of said slides provided with a protractor graduated in angular degrees about its associated axis of rotation as a center and having its zero mark in the line defining the side of the triangle parallel to the bar provided with said protractor carrying slide.

10. In a device of the class described, the combination of three bars forming the sides of a triangle, each bar provided with a slide shiftable on its associated bar and having a pivotal connection with the next adjacent bar, the axis of rotation of the three pivotal connections forming the apices of a triangle, each slide provided with a zero mark and one of said bars provided with a linear scale having its zero mark longitudinally offset from the adjacent apex the same distance and in the same direction that the zero mark on its associated scale is similarly offset from its adjacent apex.

11. A carpenter's rule comprising three elements adapted to form the three sides of a triangle, each element provided with a scale graduated in the same units of length, two of said elements being pivotally connected, the scale on one of said two pivotally connected elements having its zero at the axis of rotation of the pivotal connection, the other of said two members provided with a slide movable longitudinally thereon and provided with a vernier scale having a zero point, the third element pivoted to the slide, and said other member having the zero point of its scale displaced from said axis of rotation a distance equal to the distance between the zero of the vernier scale and the axis of the pivotal connection between the third element and the slide.

12. A carpenter's rule for determining the angles of side cut for house roof rafters, comprising three bars constituting respectively a body, a blade and an indicator coacting to define a triangle, the indicator provided with a linear scale calibrated to represent the run or one-half of the width of the house, said indicator and blade provided with means coacting for automatically setting the same at right angles to each other means pivotally connecting the blade and body, the blade provided with a linear scale calibrated to represent the rise of the roof, or height of the ridge, and the body provided with a linear scale calibrated to represent the length of the rafter, each scale having linear units thereon equal to those on the other two scales and each scale marked progressively with increasing numerical values from one of the points of intersection towards the other, whereby when the several bars are set to indicate a known run and rise and with the blade at right angles to the indicator the scale reading on the body will indicate the resultant length of the rafter and the included angle thus formed between the body and blade will indicate the plumb cut for the rafter to fit against the ridge board, and when said indicator is swung to extend perpendicular to the body without shifting its axis of rotation and the blade is shifted to contact with the end of the indicator as before then the angle between the body and blade indicates the correct angle for the side cuts of the rafter.

13. A device for providing angles from zero to ninety degrees including three bars provided with straight longitudinal rule edges, one of said bars constituting a body, another bar constituting a blade pivoted at one end to the body and movable from a position of no degree angularity parallel to the body to a position of ninety degrees angularity at right angles to the body, said blade provided with an indicator mark spaced a prefixed distance from the axis of rotation between the body and bar, the third bar shiftable about said blade indicator mark as a center and itself provided with an indicator mark spaced from said center the same distance as the indicator mark on the blade is spaced from said axis of rotation and adapted to follow a path parallel to the edge of the body, and said body provided with a degree scale graduated in degree marks of decreasing numerical values considered from the axis of rotation considered as the ninety degree mark and so spaced that when the indicator mark of the third bar is at any particular degree designation the included angle between the body and blade will be of the value so indicated.

14. A device of the class described, the combination of three bars forming a triangle, two of the bars being pivotally connected, one of said two bars provided with a zero degree mark spaced from the pivotal connection, and the other bar provided with longitudinally spaced apart degree marks progressively decreasing in numerical value from the pivotal connection, a slide movable longitudinally on said last named bar, the third bar also provided with a zero degree mark and pivotally mounted on the slide for rotary movement thereon, the spaced apart degree marks being designed to indicate in degrees the included angle between the pivotally connected bars when the third bar has one end at the first named zero degree mark and the zero degree mark of the third bar is at the numerical designation of the degrees of such angle.

15. In a device of the class described, the combination of a bar provided with a linear scale, a slide mounted for longitudinally adjusted position on the scale and provided with a coacting vernier scale, a second bar extending entirely across the first named bar and its linear scale, means for pivotally mounting the second bar for rotary movement on the slide and said means being offset from the vernier scale on the slide in a direction parallel to the length of the first named bar and at a distance therefrom sufficient to permit the vernier scale to be visible in the different angularly adjusted positions of the second bar.

16. In a device of the class described, the combination of three bars coacting to define the three lines forming the sides of a triangle, the two bars forming an apex of the triangle provided with contacting surfaces for quickly and accurately effecting a mechanical setting of the bars to extend at right angles to each other and said two bars adapted to swing about their points of intersection as centers thereby to vary any angle of the triangle at will, each bar provided with a linear scale and all of the scales having the same linear units and each scale indicating distances along its associated line from one of its points of intersection to the other, and a clamping means for securing at least the bars forming two of the angles in their relatively adjusted positions and thus temporarily securing the three sides of the formed triangle relative to each other.

17. In a device of the class described, the combination of three bars coacting to define the three lines forming the sides of a triangle, the two bars forming each apex of the triangle provided with coacting means defining an axis of relative rotation and adapted to swing about said axes as centers thereby to vary any angle of the triangle at will, each bar provided with a linear scale and all of the scales having the same linear units and each scale indicating distances along its associated line, two of the bars provided with means for automatically locating them at right angles to each other and the scale on one of said two bars having its zero point at said means.

18. In a device of the class described, the combination of three bars coacting to form a triangle, two of said bars being pivotally connected and one of said two bars provided with a slide movable longitudinally along the same, the third bar being pivotally connected to the slide, said slide provided with a scale indicator offset longitudinally from the pivotal connection between the third bar and the slide, and the bar having the slide provided with a linear scale with which the indicator coacts to indicate the distance between the two pivotal connections and the zero mark of which scale is offset in the direction towards the slide a distance equal to the distance the indicator is displaced from the adjacent pivotal connection between the slide and the third bar.

19. In a device of the class described, the combination of two bars pivotally connected and coacting to define two of the lines forming adjacent sides of a triangle, one of said bars provided with a circular opening, a pivotal disc rotatably mounted in the opening, a stop ring outlining the opening, encircling the disc and provided at diametrically opposite points with a pair of stops each provided on one side thereof with a flat face disposed in a diametrical line containing the axis of rotation of the disc and means for selectively securing the other bar to the disc to rotate therewith between said flat faces with either side of the bar facing the disc.

20. In a device of the class described, the combination of two bars pivotally connected, one of said bars provided with a circular bearing and the other bar provided with an annular part rotatably mounted in the bearing, a stop ring concentric with the bearing and provided with a pair of diametrically disposed stops located on opposite sides of the path of rotary movement of said other bar, and said stops being circumferentially spaced apart a distance and coacting with the parts of said other bar engaging the same to limit the rotary movement of said other bar relative to the stop ring to exactly ninety degrees.

BERNT M. BENSEN.